United States Patent [19]

Brandenfels

[11] Patent Number: 4,750,578
[45] Date of Patent: Jun. 14, 1988

[54] DISMANTLABLE AND COLLAPSIBLE UTILITY CART

[76] Inventor: Carl W. Brandenfels, 32934 Pittsburg Rd., St. Helens, Oreg. 97051

[21] Appl. No.: 2,388

[22] Filed: Jan. 12, 1987

[51] Int. Cl.$^4$ .......................... B62D 27/06; B62M 7/14
[52] U.S. Cl. ...................... 180/13; 180/19.2; 180/208; 180/214; 180/65.6; 180/907; 280/767
[58] Field of Search ...................... 180/19.2, 19.3, 907, 180/208, 213, 214, 180, 13, 65.6; 280/767, 293, 278, 287; 296/65 R; 192/0.096, 0.02 R

[56] References Cited

U.S. PATENT DOCUMENTS

| | | | |
|---|---|---|---|
| 451,084 | 4/1891 | Thompson | 296/65 R |
| 3,001,599 | 9/1961 | Fryar | 180/208 |
| 3,166,140 | 1/1965 | Butler | 180/19.1 |
| 3,224,524 | 12/1965 | Laher | 180/214 |
| 3,229,782 | 1/1966 | Hilton | 180/208 |
| 3,249,170 | 5/1966 | Quayle | 180/13 |
| 3,314,494 | 4/1967 | Weitzner | 180/208 |
| 3,316,993 | 5/1967 | Weitzner | 180/208 |
| 3,354,975 | 11/1967 | Stuart | 180/208 |
| 3,369,629 | 2/1968 | Weiss | 180/208 |
| 3,417,834 | 12/1968 | Smith | 180/208 |
| 3,506,080 | 4/1970 | Hott et al. | 180/214 |
| 3,513,926 | 5/1970 | Paget, Jr. | 180/208 |
| 3,570,620 | 3/1971 | Fisher et al. | 180/214 |
| 3,907,051 | 9/1975 | Weant et al. | 180/907 X |
| 3,934,669 | 1/1976 | Adams | 180/208 |
| 4,438,942 | 3/1984 | Hon | 280/278 |
| 4,452,327 | 6/1984 | Mowat et al. | 180/907 X |
| 4,522,281 | 6/1985 | Snider | 180/208 |
| 4,570,739 | 2/1986 | Kramer | 180/216 |

FOREIGN PATENT DOCUMENTS

| | | |
|---|---|---|
| 3013878 | 10/1981 | Fed. Rep. of Germany . |
| 2321419 | 3/1977 | France . |
| 956226 | 4/1964 | United Kingdom . |
| 2051702A | 1/1981 | United Kingdom . |

*Primary Examiner*—David M. Mitchell
*Assistant Examiner*—Tamara L. Finlay
*Attorney, Agent, or Firm*—Eugene M. Eckelman

[57] ABSTRACT

A chassis member with rear wheels and a battery compartment has a detachable connection with an upright front wheeled support. The front wheeled support has a steering handle assembly pivotally connected thereto which can be locked in upright position or swung rearwardly into a folded position parallel with the front wheeled support, or pivoted forwardly for use as a dolly-type handle. An electric motor is mounted on the front wheeled support and has lead wires to the battery and to a switch operated by a belt tightener providing driving power when a hand lever is depressed but providing free wheeling when the lever is released. The lead wires for the battery are of a length and have disconnects which allow the battery to be carried on the person if desired. The cart is adapted to receive a removable seat and when knocked down consists of the chassis member, the front wheeled support, the battery, and the seat if the latter is used. The cart can be used to transport a person either in a sit down or stand up position, it has luggage carrying arms on the front wheeled support, it can be used as a dolly with or without power from the battery, and importantly, each of the dismantled parts are small and light enough for easy carrying by most persons and capable of being stored in overhead airplane or other vehicle storage areas.

4 Claims, 2 Drawing Sheets

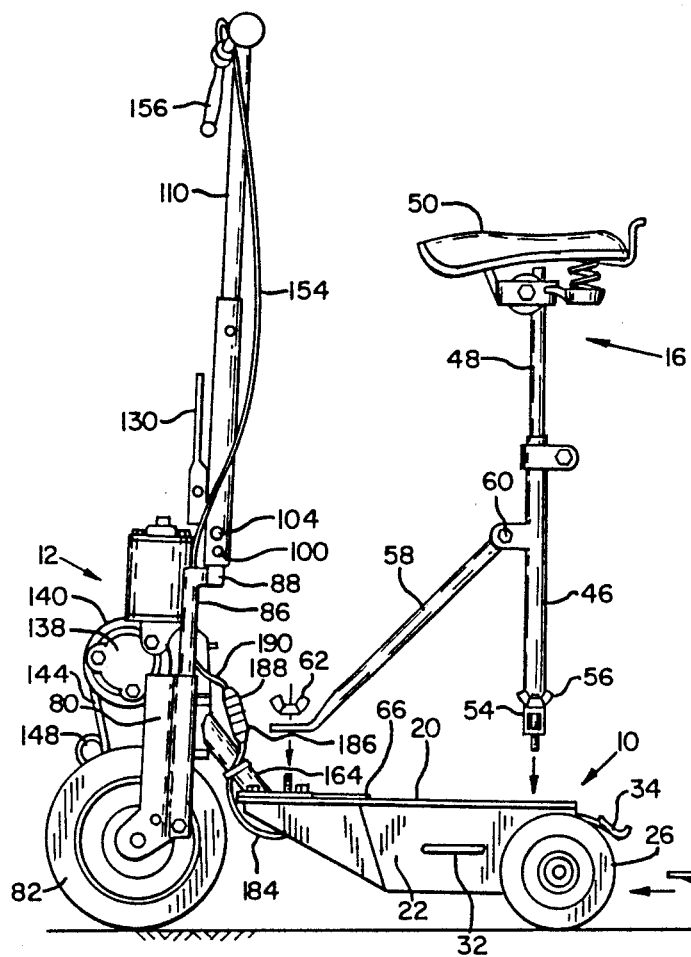
FIG.1
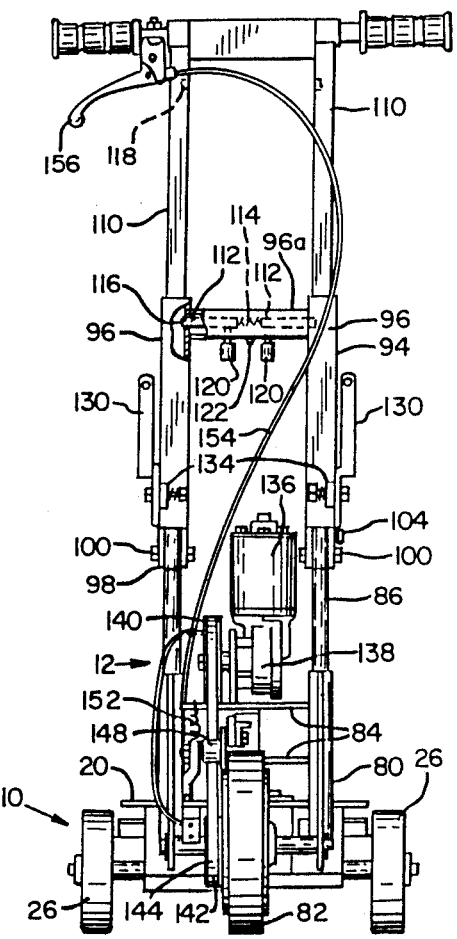
FIG.2
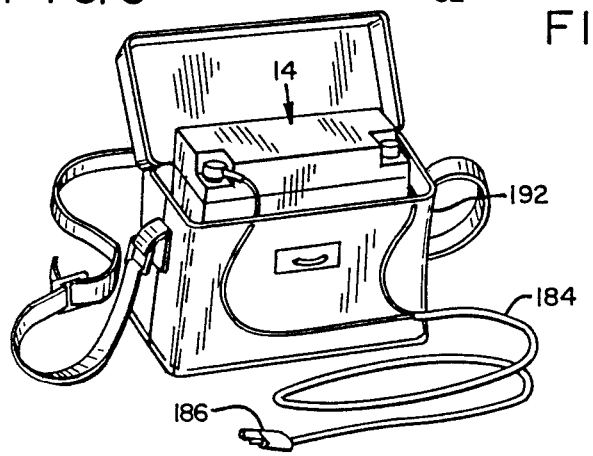
FIG.5
FIG.9
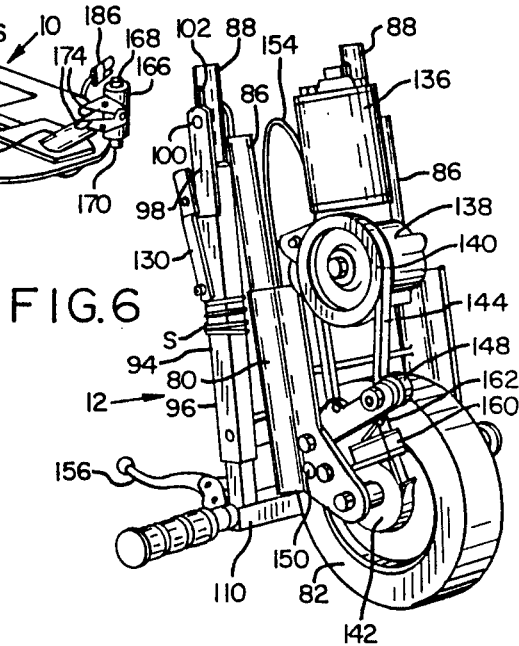
FIG.6

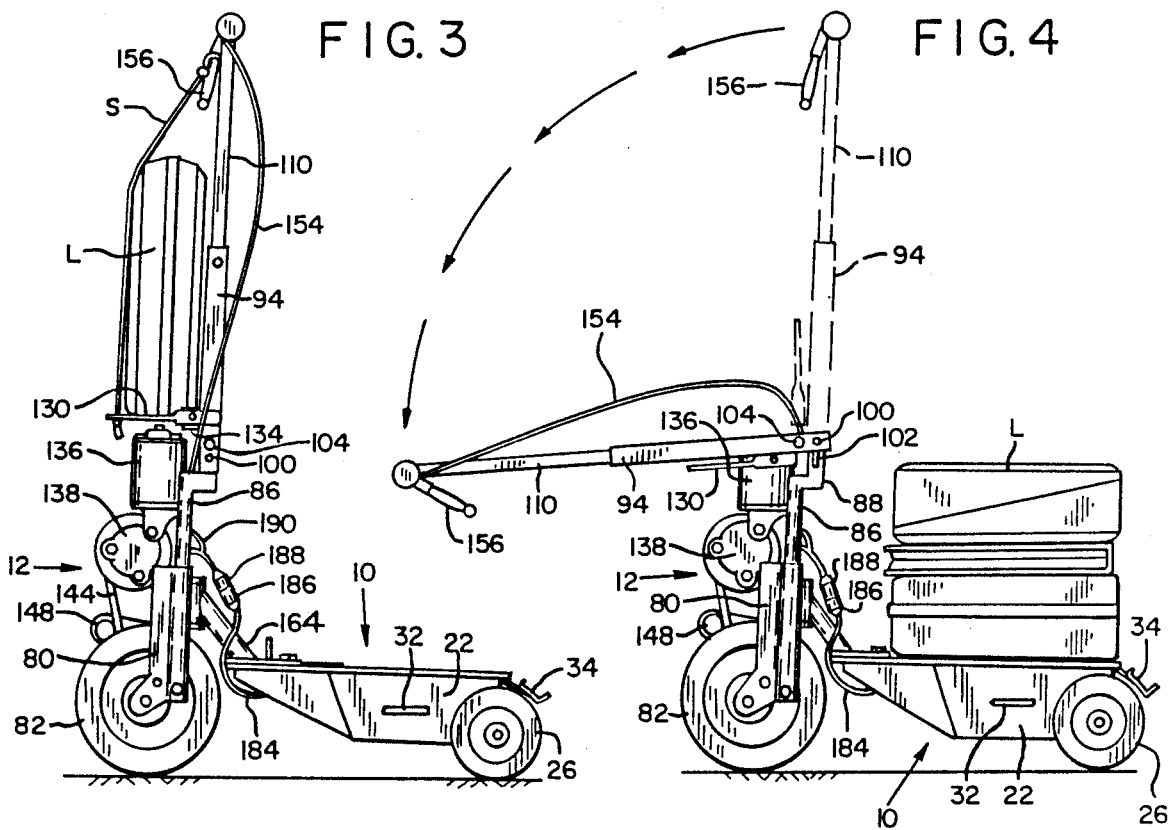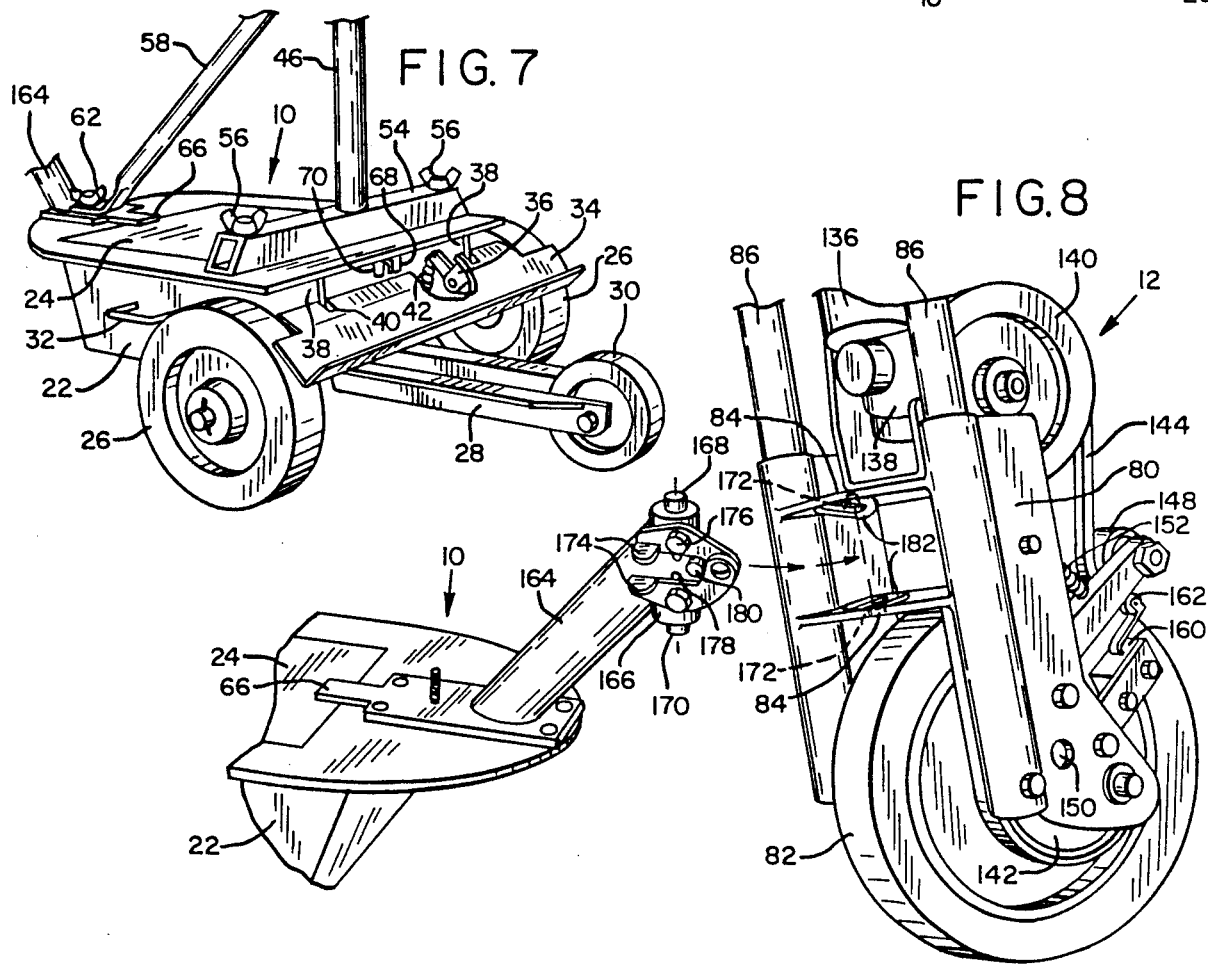

DISMANTLABLE AND COLLAPSIBLE UTILITY CART

BACKGROUND OF THE INVENTION

This invention relates to new and useful improvements in utility carts and is particularly concerned with a cart that can be dismantled into light weight parts and with some of the parts further being collapsible for easy carrying and storage.

Various types of portable and powered carts have heretofore been provided for the short distance transportation of a person or articles such as luggage. Representative patents of this sort comprise U.S. Pat. Nos. 3,369,629 and 3,934,669. These carts have means for compacting them such as foldable steering handles or wheels. U.S. Pat. No. 3,417,834 is directed to a motor scooter having telescoping structure to reduce its size. U.S. Pat. No. 3,513,926 shows a cart having removable parts which can be assembled in a compact storage package. Further foldable carts are shown in U.S. Pat. Nos. 3,316,993, 3,314,494, 3,354,975 and 4,570,739.

While the structures of the above-mentioned patents would appear to serve their intended purpose, it is noted that the resulting compacted apparatuses are not of the type that can conveniently transport a person and luggage and in addition be readily carried around by one person or stored in small places.

SUMMARY OF THE INVENTION

According to the present invention and forming a primary objective thereof, a utility cart is provided that not only can be dismantled into parts that are readily carried but some of the parts have novel collapsible features that permit them to be stored in small places such as carry-on storage areas of airplanes, buses, etc. The present parts include a conveniently removable battery.

A more particular object of the invention is to provide a cart of the type described which utilizes a chassis member and a front wheeled support arranged to be disconnected and each further having compacting means including pivoting and telescoping means in the wheeled support and seat and battery removal means in the chassis member, whereby the cart when dismantled and folded can be carried in three or four lightweight pieces.

Additional objects of the cart are to provide a platform-type chassis member and a removable seat for making the cart usable either as a sit-down riding cart or a scooter-type cart; to provide a steering handle for a front wheeled support which has a pair of forwardly projecting arms arranged to support articles to be carried; to provide a steering handle on the front wheeled support which can be used in upright position as a steering handle for persons riding a cart or as a guide handle in a forwardly pivoted position for persons walking with the cart; to provide a circuit arrangement which maintains power to the motor when said steering handle is in both an upright position or a forward pivoted position; to provide a belt drive that provides a free wheeling condition of the front wheel but tightens the belt when the motor is energized; and to provide a novel arrangement of connections and compacting structure for reducing the cart down to small pieces for carrying and storage.

In carrying out the objectives of the invention, a chassis member is provided which has rear wheels and a battery compartment for removably holding a battery. A front wheeled support is detachably secured to the forward end of the chassis member and includes an upright steering handle. Releasable locking pivot means are connected between the steering handle and a wheel and fork assembly of the front wheeled support for holding the steering handle either in an upright steering position or a folded down collapsed position substantially parallel with the wheel and fork assembly. The steering handle also has telescoping means to foreshorten it. An electric drive motor is supported on the wheel and fork assembly, and control means extend from the motor to an upper portion of the steering handle. Circuit wire means between the motor, battery and control means having a disconnect therein so that the battery can readily be separated from the chassis member and carried separately. A removable and foldable seat is provided on the chassis member. The steering handle has a forward intermediate position to serve as a handle for manipulating the cart when the person is not riding thereon. The power drive circuit of the cart is arranged such that control of the motor can be maintained in this forward pivoted position of the steering handle. A combination belt tightener and operating switch is provided on the front wheeled support in an arrangement to provide freewheeling when the motor is deenergized but to provide a drive therefor when the motor is energized. A pair of foldable front arms are provided on the steering handle and are arranged to support articles to be carried.

The invention will be better understood and additional objects and advantages will become apparent from the following description taken in connection with the accompanying drawings.

BRIEF DESCRIPTION OF THE DRAWINGS

FIG. 1 is a side elevational view of the utility cart of the invention, portions of the cart being shown in dismantled relation;

FIG. 2 is a front elevational view of the cart;

FIG. 3 is a side elevational view of the cart showing the seat removed and also showing an article carried on the steering handle;

FIG. 4 is a view similar to FIG. 3 and showing articles being carried on the chassis member and also showing the steering handle pivoted to a forward position.

FIGS. 5 and 6 are perspective views showing the two main parts of the cart comprising the chassis member and front wheeled support, respectively, in dismantled relation.

FIG. 7 is a fragmentary rear perspective view of the chassis member showing in particular braking means therefor and a rear stabilizing wheel assembly.

FIG. 8 is a fragmentary perspective view showing in particular connecting structure between the chassis member and the front wheeled support, and FIG. 9 is a perspective view of the battery for powering the present cart and illustrating the concept that the battery can be carried as a separate piece.

DETAILED DESCRIPTION OF A PREFERRED EMBODIMENT

With particular reference first to FIGS. 1, 2, 5, 6 and 9, the major and separable parts of the invention comprise the chassis member 10, a front wheeled support 12, a battery 14, and a seat 16.

The chassis member 10 has a platform-like top wall 20 and a battery compartment 22 under this top. A removable floor plate 24, FIGS. 5 and 7, is provided in the top wall 20 for ready access to the battery compartment. Chassis member 10 has a pair of rear wheels 26 and a rear frame extension 28 with a small stabilizing wheel 30 on the end thereof to prevent rearward tipping of the cart when the seat is used for sit-down transportation of a person. This frame extension can be bolted in place with wing nuts and thus removable if desired for compacting the chassis member in its longitudinal dimension. The extension 28 and wheel 30 are arranged such that the bottom of wheel 30 is higher than the bottom of wheels 26 and thus is used only if the person should tilt the cart rearward. A carry handle 32 is mounted on one side of the chassis member.

A brake plate 34 has angled lever arms 36, FIG. 7, pivotally supported on rear edge portions of side walls 38 of the battery compartment. The plate 34 has slots 40 freely receiving the side walls for free pivotal movement of the plate and is held in a pivoted position away from the wheels 26 by tension springs 42 connected between the lever arms 36 and the chassis member. Such springs are readily overcome by a small pressure from the operator's foot for causing the plate 34 to frictionally bear against the surface of the wheels for braking.

The seat 16, FIGS. 1 and 7, has a main standard 46 and a vertically adjustable seat supporting stem 48 mounted telescopically thereon. The seat 50 is of conventional construction and if desired can be pivoted into alignment with the stem for the purpose of compacting the seat assembly. The standard 46 is integral with a cross base member 54 which is removably secured to the chassis member 10 by bolt and wing nut assemblies 56. A forward angled brace 58 has a pivot connection 60 at its upper end to the standard and has a detachable bolt and wing nut connection 62 at its lower end to a front portion of the chassis member. The seat assembly is readily removable by disengagement of the bolt and wing nut assemblies 56 and 62 and can be compacted by pivoting the brace 58 into parallel relation with the standard 46 and by pivoting the seat in parallel relation to the stem 48.

Fastening means for the plate 24 is provided which allows fast removal or mounting of this plate so that the battery can be readily installed or removed. For this purpose, the front of the plate 24 freely fits under the end of a tab 66, FIGS. 5 and 7, and the rearward end has a rotatable latch 68 with removable engagement in a slotted depending pin 70 projecting downwardly through the top wall 20 of the chassis member. By releasing the latch 68, the rearward end of the plate 24 can be lifted and disengaged from under the tab 66 for easy removal.

The front wheeled support 12 comprises a bottom fork and axle assembly 80 for a drive wheel 82. This fork and axle assembly 80 has cross webs 84, FIG. 8, in vertically spaced relation, such webs providing reinforcement for this assembly and also providing for connection of the chassis member to the front wheeled support as will be described hereinafter. The fork and axle assembly has a pair of upwardly extending integral stems 86, FIGS. 1–4 and 6, having an upper short rearwardly offset extension 88. A steering and control handle assembly 94 is mounted on the offset extension 88 in an arrangement which allows the handle to be locked in upright relation as seen in FIGS. 1–4, or to be pivoted to a forwardly extending position as seen in FIG. 4, or to be folded down rearwardly in a position which is parallel to the fork and wheel assembly, as shown in FIG. 6. For this purpose, the steering and control handle assembly 94 has a pair of tubular members 96 integrated at the upper portion thereof by a cross tube 96a and having an integral bifurcated bottom end 98 which fits on the offset extensions 88 and has pivotal connection thereto by means of cross pins 100 mounted on the bifurcated portions 98 and passing through cross slots 102 in the extensions 88. The slots 102 are elongated in a vertical direction.

Mounted in one of the bifurcated portions 98 immediately above the pivot pin 100 is a spring pressed latch pin 104 which projects through the one side of the bifurcation and is arranged to engage the slot 102 in the upright position of the handle assembly 94. More particularly, with the handle assembly in a vertical position, it is moved in a downwardmost slidable position on the extension 88, and in such extension, the pin 104 is arranged to engage an upper portion of the slot 102. The handle assembly 94 will thus be held rigidly in an upstanding position in the use position of the cart for safety reasons. When it is desired to pivot the handle forwardly to the FIG. 4 position, the pin 104 is manually released and the handle can be swung forwardly. Also, the handle assembly 94 can be pivoted rearwardly, with the release of the pin 104, for providing a folded condition of the front wheeled support, as shown in FIG. 6. The bifurcated portions 98 are of sufficient length to allow the lower ends of tubular members 96 to clear the bottom end of extensions 88 and compact into substantially axial alignment with the extensions 88 whereby the handle assembly can be folded into substantially parallel relation with the fork and wheel assembly.

Tubular members 96 are open at the top and telescopically receive handle bar supports 110. These supports can be moved to an upward position for cart operation or can be telescopically moved downwardly for compacting the unit 12. It is preferred that each of the upper and lower positions of the handle bar assembly have safety latched positions, and for this purpose, the reinforcing cross member 96a has spring pressed pins 112 slidably guided laterally therein and arranged to extend into the interior of the tubular members 96. These pins are held apart by a compression spring 114 and are arranged for engagement with holes 116 in a lower portion of the support 110 or holes 118 in an upper portion of such supports. In the position shown in FIGS. 1–4, pins 112 are engageable with the lower holes 116 to hold the handlebar assembly upwardly in locked position. By releasing the pins, the handlebar assembly can be telescoped downwardly in compacted relation and held in such compacted relation by engagement of the pins 112 with the holes 118. Pins 112 are connected to finger engaging knobs 120 operating in suitable bottom slots in the cross member 96a and being associated with a central abutment 122 therebetween whereby to provide full release of both pins when the knobs are squeezed together.

The tubular members 96 are each provided with an arm member 130 pivotally supported thereto by a pin 132 and arranged to be moved to an upright non-use position shown in FIGS. 1, 2 and 4 or to a straight out position for supporting luggage L or other articles as shown in FIG. 3. The horizontal position of these arms is maintained by abutments 134 on the members 96. The luggage can be held in place by straps or cords S attached at one of their ends to the arms and to their other ends to the latch holes 118.

Power drive for the front wheel 82 is achieved by a small electric motor 136, FIGS. 1, 2 and 6, having an integrated gear box 138. The gear box and motor are secured to the upper cross web 84. The output shaft of gear box 138 has a pulley 140 keyed thereto and arranged to drive a pulley 142 on the wheel by a V-belt 144. These pulleys and belt are arranged such that the belt will normally slip in a nondriving relation. Driving connection of the belt is provided by a belt tightener 148, FIGS. 6 and 8 having a pivot support 150 at its rearward end on the fork and axle assembly and engageable at a roller forward end with the forward run of the belt. The belt tightener 148 is held in retracted position by a tension spring 152, FIG. 2, and is pivoted to a belt tightening position by a flexible cable 154 connected thereto and leading to an operator's handle lever 156 on the handle bar assembly. Thus, the front wheel 82 will normally be freewheeling so that the cart will roll freely relative to the motor drive, and power drive of the wheel is accomplished by depressing the lever 156 which tightens the belt.

Lever 156 also controls the electrical drive of the motor 136. Closing of the circuit to the motor and tightening of the belt are accomplished simultaneously by a microswitch 160 mounted on the fork assembly under the belt tightener 148 in an arrangement such that as the belt tightener moves upwardly by the operation of the lever 156, it permits a spring pressed lever 162 of the switch 160 to close the circuit between the motor and the battery. Thus, when the lever 156 is depressed by the operator, the belt is tightened and the wheel powered, and when the lever 156 is released, power to the wheel is shut off and the belt tightener is released, thus allowing slippage of the belt and freewheeling of wheel 82.

Detachable connection between the chassis member 10 and the front wheeled support 12 is detailed in FIG. 8. For this purpose, the front end of the chassis member 10 has a forwardly and upwardly angled integral stem 164 having an end upright tubular spindle housing 166 with upper and lower pins 168 and 170, respectively projecting therefrom. These pins are spring pressed apart, by suitable spring means in the housing and are dimensioned and arranged to engage apertures 172 in the cross webs 84 of the fork assembly. Spring pressed pins 168 and 170 are arranged to be retracted by levers 174 pivotally supported at one of their ends on the housing 166 and secured to the respective pins by suitable projections 176 on the levers, these projections operating in slots 178 for the required pivotal movement of the levers. For the purpose of connecting the two members 10 and 12, the levers 174 are moved together to retract the pins 168 and 170 whereby the spindle 166 can be mounted on the fork assembly by engaging these pins with the upper and lower apertures 172 on the fork assembly. A center abutment 180 between the levers provides full release of both pins when the levers are squeezed fully together. The facing surfaces of webs 84 around the apertures 172 are provided with guide ribs 182 at the rear and sides of the apertures for guiding the pins 168 and 170 into said apertures.

Power for driving the motor comprises the battery 14, FIG. 9, having suitable leads 184, FIG. 1, terminating at the end thereof in an electrical connector 186 arranged for detachable mating connection to a connector 188 in electrical leads 190 in the circuit to the motor and the microswitch. For a reason to be described, the lead 184 on the battery is several feet long. As apparent from the above, the utility cart of the invention includes a plurality of dismantlable parts some of which can be reduced in size by folding or telescoping. The novel compaction of the front wheeled support 12 is accomplished by the rearward folding of the handle assembly 94, as shown in FIG. 6, and by the telescoping structure of the handle bar supports 110. With the assembly 12 compacted, it, as well as the chassis member 10, can be carried in canvas bags or the like as separate pieces. Such makes the device portable for almost any person and in addition, the dismantled cart can be carried onto airplanes, buses and the like and stored in the overhead storage compartments so that the person can take the cart along. The seat assembly 16 can also be removed and compacted for easy carrying and storage.

Also important to the invention, the battery 14 is easily removed and thus comprises a separate carrying article which may be carried in a shoulder bag 192, FIG. 9, or the like. The unit thus comprises three easy-to-carry parts, four if the seat is taken along, with the heaviest part, comprising the front wheel assembly, weighing less than 15 lbs. The battery comprises a sealed, non-explosive type, and since it is designed for carrying on the person in a sachel, it is able to be readily inspected by airline security. It can be mounted in the battery compartment 22, or it can be carried on the person in a sachel or on the arms 130 or hung on the handle bars. A small battery charger, not shown, can also be carried with the battery and is provided with connector leads that fit the connector 188.

In assembled relation, the cart is arranged to be used to transport a person either in a sit down position with the seat installed, FIGS. 1 and 3, or in a stand up scootertype position with the seat removed, FIG. 3. In either of these conditions of the cart, luggage L may be carried on the front arm members 130 as shown in FIG. 3. The extension 28 is used when a person is to ride on the seat; otherwise, this extension can be removed.

The cart can also be used as a dolly, as shown in FIG. 4, for carrying luggage L, by unlatching the handle from its upright position and pivoting it forward so that the user can guide the cart. The user can push or pull the cart or can use the hand lever 156 to power it. The battery can either be mounted in the chassis member or carried on the person, and if carried on the person it still can serve to drive the cart by extending its lead 184 from the person to the connector 186 on the cart. Braking is readily accomplished by compressing the brake plate 34 with the foot.

It is to be understood that the form of my invention herein shown and described is to be taken as a preferred example of the same and that various changes in the shape, size and arrangement of parts may be resorted to without departing from the spirit of my invention, or the scope of the subjoined claims.

Having thus described my invention, I claim:

1. A utility cart comprising:
    a chassis member having forward and rearward ends and upper and lower portions;
    a pair of rear wheels on said chassis member;
    a battery compartment depending from a lower portion of said chassis member;
    a battery removably contained in said compartment;

a front wheeled support for the cart having front and rear portions and including a front wheel and a fork assembly therefor;

detaching means on the forward end of said chassis member and on said front wheeled support detachably securing said chassis member and said front wheeled support together;

said front wheeled support including an upright steering handle;

releasable locking pivot means connected between said steering handle and said front wheel and fork assembly holding said steering handle either in an upright steering position, a folded down compacted position substantially parallel with said front wheel and fork assembly, or a forward pivoted position to serve as a push-pull handle for manipulating the cart;

releasably locking telescoping means in said steering handle arranged to telescope and foreshortened handle;

an electric motor supported on said front wheel and fork assembly;

drive means between said motor and said front wheel;

control means extending from said motor to an upper portion of said steering handle;

circuit wire means extending between said motor, battery and control means, said circuit wire means being of an arrangement to maintain a circuit to said control means in the forward pivoted position of said steering handle whereby said control means is capable of controlling power to said motor when said steering handle is in its said steering position or its forward pivoted position;

said drive means comprising a belt and pulley drive which normally slips on the pulleys to provide free wheeling of said wheel, a belt tightener on said front wheel support operated by said control means to tighten said belt when said control means is engaged for driving the wheel, and a switch in said circuit wire means engageable by said belt tightener operative to close said circuit wire means when said belt is tightened for driving the wheel and to open said circuit wire means when said belt slips for providing freewheeling of the wheel;

a disconnect in said circuit wire means allowing said chassis member and front wheeled support to separate upon disengagement of said detaching means;

and an upstanding seat detachably secured to the upper portion of said chassis member;

said front wheeled support with said steering handle telescoped and pivoted in folded down compacted condition parallel with said wheel and fork assembly and said chassis member when detached from said front wheeled support with said seat detached all being compacted into individual pieces capable of being readily carried as separate packages by one person.

2. The utility cart of claim 1 including a pair of arms on the front of said steering handle above said electric motor and drive means arranged to support articles to be carried.

3. The cart of claim 1 including a rear extension on said chassis member having a stabilizing wheel disposed rearwardly of the rearward end of said chassis member to stabilize the latter against rear tipping, said rear extension supporting said stabilizing wheel normally in spaced relation above a supporting surface but engageable with the latter only upon rearward tipping of the cart.

4. The cart of claim 1 wherein said detaching means on said chassis member and said front wheeled support comprises a pair of vertically spaced horizontal and rearwardly extending flanges on said front wheeled support, vertically aligned socket means in each of said flanges, an upright stem on the forward end of said chassis member, oppositely extending spring pressed pins on said stem arranged to engage respective ones of said socket means in their normal spring pressed condition, and lever means on said stem arranged to retract said pins for attaching and detaching said front wheeled support relative to said chasssis member.

* * * * *